(12) United States Patent
Tajima

(10) Patent No.: US 7,364,331 B2
(45) Date of Patent: Apr. 29, 2008

(54) VEHICLE LAMP

(75) Inventor: Keiichi Tajima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/453,642

(22) Filed: Jun. 14, 2006

(65) Prior Publication Data

US 2006/0291229 A1 Dec. 28, 2006

(30) Foreign Application Priority Data

Jun. 23, 2005 (JP) ............................ P.2005-183764

(51) Int. Cl.
*F21V 1/00* (2006.01)
(52) U.S. Cl. ...................... 362/509; 362/508; 362/512; 362/523; 362/530; 362/531; 362/532; 362/37
(58) Field of Classification Search ................ 362/509, 362/508, 475, 476, 512, 523, 524, 528, 530, 362/531, 532
See application file for complete search history.

(56) References Cited

U.S. PATENT DOCUMENTS

| | | | | |
|---|---|---|---|---|
| 6,425,683 | B1 * | 7/2002 | Kusagaya et al. | 362/512 |
| 6,918,691 | B2 * | 7/2005 | Gattone et al. | 362/515 |
| 7,008,093 | B2 * | 3/2006 | Fukawa et al. | 362/539 |
| 7,066,632 | B2 * | 6/2006 | Burton | 362/524 |
| 2001/0040810 | A1 * | 11/2001 | Kusagaya | 362/351 |
| 2003/0021119 | A1 * | 1/2003 | Blusseau et al. | 362/277 |
| 2003/0072164 | A1 * | 4/2003 | Watanabe et al. | 362/465 |
| 2003/0090906 | A1 * | 5/2003 | Hayakawa | 362/517 |
| 2006/0291230 | A1 | 12/2006 | Tajima et al. | |

FOREIGN PATENT DOCUMENTS

| | | |
|---|---|---|
| JP | 09-330603 | 12/1997 |
| JP | 2003-257218 | 9/2003 |
| JP | 2003-260980 | 9/2003 |
| JP | 2004-227933 | 8/2004 |

\* cited by examiner

*Primary Examiner*—Ali Alavi
*Assistant Examiner*—Evan Dzierzynski
(74) *Attorney, Agent, or Firm*—Fish & Richardson P.C.

(57) ABSTRACT

A vehicle lamp is provided with a single lamp unit for irradiating light of a light source in a desired direction as irradiating light, and an irradiating light control apparatus constituted by integrally assembling a horizontal driving device for pivoting the lamp unit in a horizontal direction, a vertical driving device for pivoting the lamp unit in a vertical direction, and a switching drive portion of a light amount changing device for changing an irradiating light amount of the irradiating light to a single case. An irradiating direction of the irradiating light in the horizontal direction, an irradiating direction thereof in the vertical direction and an irradiating light amount thereof can pertinently be controlled by driving the respective devices.

12 Claims, 11 Drawing Sheets

VEHICLE LAMP

The present application claims foreign priority based on Japanese Patent Application No. P.2005-183764, filed on Jun. 23, 2005, the contents of which are incorporated herein by reference.

BACKGROUND OF THE INVENTION

1. Field of the Invention

The present invention relates to a vehicle lamp. Specifically, the present invention relates to a vehicle lamp capable of adjusting irradiating light in a horizontal direction and in a vertical direction and capable of changing an irradiating light amount, and relates to a technology for small sizing, weight saving, and lowering cost of the vehicle lamp.

2. Related Art

There is a vehicle lamp switching a light distribution pattern, and changing an irradiating direction in accordance with a situation of running a vehicle.

For example, there is a vehicle lamp switching to irradiate a lower beam (a passing beam) used in running at an urban area or when there is a vehicle running on an opposed lane and an upper beam (a driving beam) used in running at a suburban area or on a highway. Disclosed in JP-A-09-330603 or JP-A-2003-257218 is a vehicle lamp in which a light distribution pattern formed with a cutoff line of an upper edge by a shade and a light distribution pattern which is not blocked by the shade are switched to irradiate by moving a position of the shade by a switching drive portion of a light distribution pattern switching device using a solenoid.

Further, for example, in a headlamp for an automobile, there is a case in which an irradiating direction is excessively directed upward or excessively directed downward by a change in a load. In such a case, it is necessary to make the irradiating direction in a correct direction by pertinently changing the irradiating direction in a downward direction or in an upward direction. Further, in a case of running on a meandering load or curving at a cross point, when an irradiating direction can be changed to the left or to the right in order to swiftly irradiate a road face or the like in an advancing direction of the automobile, it is convenient.

Disclosed in JP-A-2003-260980 or JP-A-2004-227933 is a headlamp in which a fixed lamp and a swivel lamp are supported by a bracket which is inclinable relative to a lamp body, and the swivel lamp is able to swung in a horizontal direction relative to the bracket. The headlamp is a swivel actuator for swinging the swivel lamp in the horizontal direction relative to the bracket, and a leveling actuator for tilting the bracket in a vertical direction relative to the lamp body.

According to the headlamp, the irradiating direction of the swivel lamp can be changed in the horizontal direction by swinging the swivel lamp in the horizontal direction by driving the swivel actuator, and irradiating directions of the fixed lamp and the swivel lamp supported by the bracket can be changed in the vertical direction by tilting the bracket in the vertical direction by driving the leveling actuator.

According to the headlamp shown in JP-A-2003-260980 and JP-A-2004-227933, the irradiating direction can be changed in the horizontal direction and in the vertical direction pertinently in accordance with the situation of running the vehicle.

However, according to the headlamp shown in JP-A-2003-260980 or JP-A-2004-227933, since the swivel actuator and the leveling actuator are separately provided, a number of pieces of parts and a number of attaching steps are increased so that production cost is increased. In addition, a space for arranging two kinds of the actuators needs to be increased to bring about a large-sized formation of the headlamp.

Moreover, a light distribution pattern cannot be controlled to be switched and therefore, it is needed to mount another headlamp having a different light distribution pattern on the vehicle, and a total of a headlamp system is obliged to be extremely large-sized.

SUMMARY OF THE INVENTION

One or more embodiments of the present invention provide a small, light and inexpensive vehicle lamp capable of adjusting irradiating light in a horizontal direction and in a vertical direction and capable of changing an irradiating light amount.

In accordance with one or more embodiments of the present invention, a vehicle lamp is provided with: a lamp unit; and an irradiating light control apparatus. The irradiating light control apparatus is constituted by integrally assembling: a horizontal driving device that swings the lamp unit in a horizontal direction; a vertical driving device that tilts the lamp unit in a vertical direction; and a switching drive portion of a light amount changing device that changes an irradiating light amount of an irradiating light of the lamp unit.

In the vehicle lamp, the irradiating light can be adjusted in the horizontal direction and in the vertical direction and the irradiating light amount can be changed. Further, the vehicle lamp can be small sized in a low cost.

In the vehicle lamp, the three devices for controlling three elements necessary for controlling the irradiating light are integrally assembled in a single irradiating light control apparatus and therefore, the irradiating light control apparatus can be structured by reducing a number of pieces of parts and small-sized, thereby, a number of integrating steps of the irradiating light control apparatus is reduced and the irradiating light control apparatus can inexpensively be manufactured owing to the reduction in the number of pieces of parts. Further, since the irradiating light control apparatus can be small-sized, also the vehicle lamp integrated therewith can be structured to be small-sized.

In the conventional vehicle lamp shown in, for example, JP-A-09-330603 or JP-A-2003-257218, the lamp unit integrated with the light distribution pattern switching device using the solenoid for moving the shade for switching the light distribution pattern (also changing the irradiating light amount) is pivoted in the horizontal direction or in the vertical direction, a load applied on the horizontal driving device or the vertical driving device for pivoting the lamp unit having a heavy weight by mounting the light distribution pattern switching device is large. Thereby, not only power consumption is increased but also an influence is effected on service life of the driving device. However, in accordance with one or more embodiments of the present invention, the switching drive portion of the light amount changing device is integrally assembled to the single irradiating light control apparatus along with the other two driving device. Therefore, the lamp unit can be made to be light-weighted, the load applied on the horizontal driving device and the vertical driving device becomes small by that amount, and power saving formation and the long service life formation can be achieved.

Further, in accordance with one or more embodiments of the present invention, the light amount changing device may be provided with a shade for blocking a part of the light emitted from the light source and can change an amount of blocking the light emitted from the light source by switching a position of the shade. The horizontal driving device may include a horizontal pivoting shaft connected to the lamp unit. The switching drive portion of the light amount changing device may include a switching drive shaft disposed at a center of the horizontal pivoting shaft. A position of the shade may be switched by moving the switching drive shaft cooperatively with the shade and moving the switching drive shaft in an up and down direction. The lamp unit may be pivoted in the horizontal direction by rotating the horizontal pivoting shaft. As a result, the switching drive shaft can be arranged by utilizing the center portion of the horizontal pivoting shaft and therefore, further small-sized formation of the irradiating light control apparatus can be achieved.

Moreover, in accordance with one or more embodiments of the present invention, the horizontal driving device, the vertical driving device and the switching drive portion of the light amount changing device may be integrated to a single case and therefore, handling of the irradiating light control apparatus is facilitated.

Moreover, in accordance with one or more embodiments of the present invention, the lamp unit may be disposed inside of a lamp housing pivotably in the horizontal direction and in the vertical direction, the irradiating light control apparatus may be pivotable in the vertical direction relative to the lamp housing along with the lamp unit and therefore, the irradiating light control apparatus can be handled integrally in a state of being integrated to the lamp unit and therefore, operability of integrating to the lamp housing becomes excellent.

Moreover, in accordance with one or more embodiments of the present invention, power feeding and/or a control signal may be supplied to the horizontal driving device, the vertical driving device and the switching drive portion of the light amount changing device by way of a single connector and therefore, a control circuit of the irradiating light can be simplified. Further, supply lines for supplying power feeding and/or the control signal are summarized to a single piece and therefore, wiring of the supply line at inside of the housing is facilitated.

In addition, in accordance with one or more embodiments of the present invention, a vehicle lamp is provided with: a lamp unit; and an irradiating light control apparatus constituted by integrally assembling a horizontal driving device that swings the lamp unit in a horizontal direction, and a vertical driving device that tilts the lamp unit in a vertical direction, within a single case member. A horizontal pivoting shaft of the horizontal driving device, a horizontal direction driving motor that drives the horizontal pivoting shaft, a vertical direction driving motor that drives the vertical driving device, and a connector for the a horizontal direction driving motor and the vertical direction driving motor are arranged on a symmetry axis.

The vehicle lamp may be provided with alight amount changing device that changes an irradiating light amount of an irradiating light of the lamp unit. A drive portion of the light amount changing device may be integrally assembled within the irradiating light control apparatus. An operating shaft of the light amount changing device may be arranged on the symmetry axis.

The vehicle lamp may be provided with a middle wall for dividing the case member into a circuit portion and a mechanism portion by the middle wall. Mechanism parts are arranged in the mechanism portion, and a circuit board is arranged in the circuit portion.

The vehicle lamp may be provided with connecting portions including inserting holes and facing holes for connecting the circuit portion and the mechanism portion. The inserting holes and the facing holes may be symmetrically arranged with respect to the symmetry axis.

In addition, in accordance with one or more embodiments of the present invention, a vehicle lamp is provided with: a lamp housing; a lamp unit supported in the lamp housing tiltably at a tilting fulcrum; and a vertical driving device that tilts the lamp unit in a vertical direction by an axial movement of a leveling output shaft of the vertical driving device. The vertical driving device is supported by the lamp unit. An end of the leveling output shaft is connected to the lamp housing at a connecting point. A line including a tilting fulcrum and a point near the connecting point intersects with the leveling output shaft at substantially 90°.

The vehicle lamp may be provided with a horizontal driving device that swings the lamp unit in a horizontal direction. The vertical driving device and the horizontal driving device are integrally assembled.

The vehicle lamp may be provided with a light amount changing device that changes an irradiating light amount of an irradiating light of the lamp unit. A drive portion of the light amount changing device may be integrally assembled with the vertical driving device.

Other aspects and advantages of the invention will be apparent from the following description and the appended claims.

DETAILED DESCRIPTION OF THE EXEMPLARY EMBODIMENTS

Exemplary embodiments of the invention will be described with reference to the accompanying drawings.

Further, in the exemplary embodiment, a vehicle lamp is applied to a headlamp for an automobile.

Figure 1:
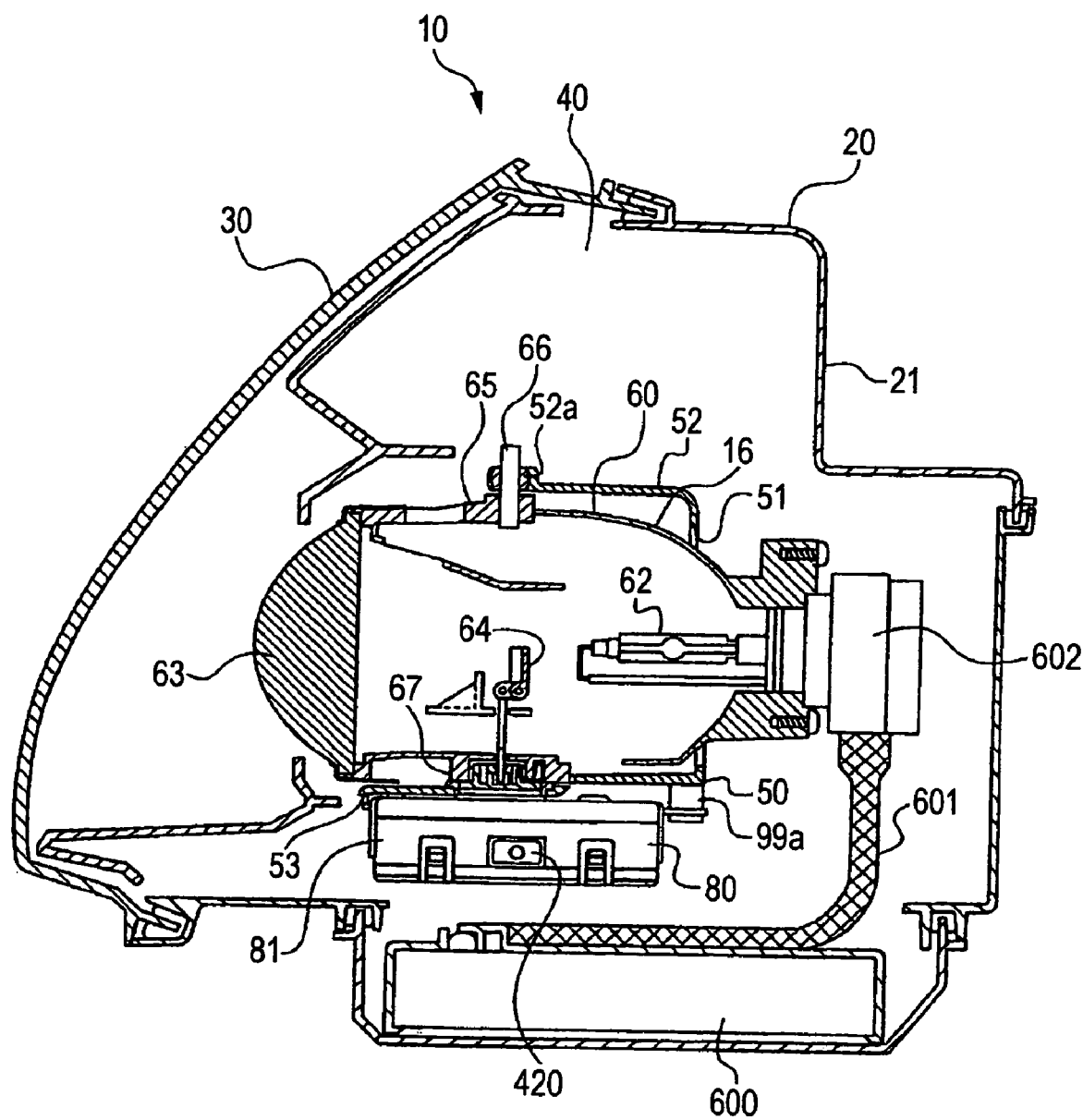
FIG. 1 is a drawing shows an example applying a vehicle lamp of an exemplary embodiment of the present invention to a headlamp for an automobile and the drawing is a vertical sectional view of a total.

As is known from FIG. 1, a headlamp 10 for an automobile is provided with a lamp housing 20 having a recess portion opened to a front side and a front face opening of the lamp housing 20 is covered by a transparent cover 30 to form a lamp chamber 40.

Figure 2:
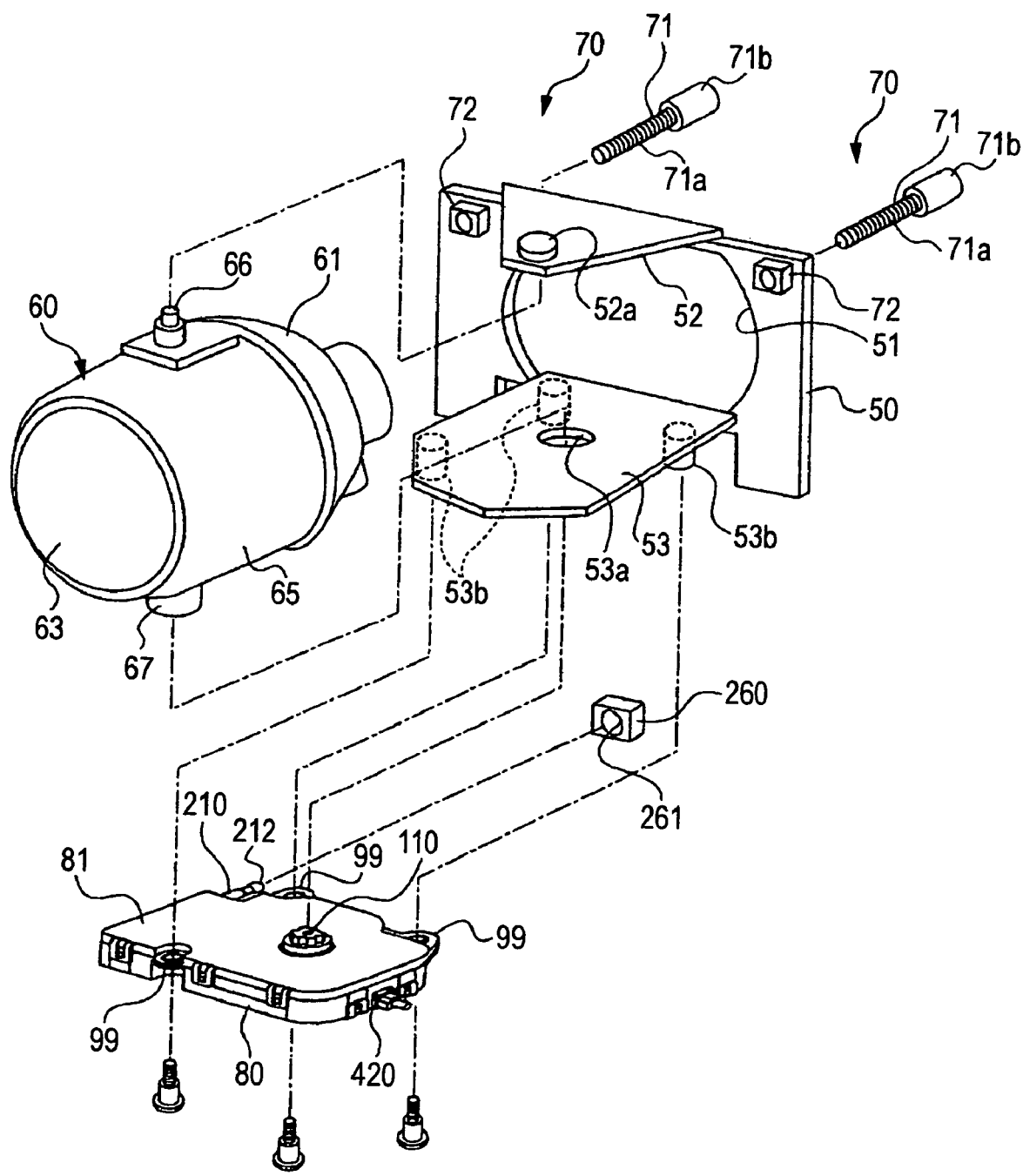
FIG. 2 is an outline perspective view separating to show an lamp unit, a bracket, an irradiating light control apparatus.

As is known from FIG. 1 and FIG. 2, inside of the lamp chamber 40 is arranged with a bracket 50 inclinably supported by the lamp housing 20, and an lamp unit 60 is supported by the bracket 50 inclinably in a horizontal direction. The bracket 50 is supported by pivoting fulcrum portions 70, 70 at two points of an upper portion thereof remote from each other in the horizontal direction and a lower portion thereof is supported by way of a vertical driving device of an irradiating light control apparatus, mentioned later.

The pivoting fulcrum portion 70 is constituted by an adjusting shaft 71 rotatably supported by a rear face wall 21 of the lamp housing 20 and a nut member 72 supported by the bracket 50. The adjusting shaft 71 is constituted by being integrally formed with a head portion 71b at a rear end of a screw shaft portion 71a, the head portion 71b is projected to a rear side of the rear face wall 21 of the lamp housing 20 and the adjusting shaft 71 can be rotated by operating the head portion 71b. The nut member 72 is supported in a state of being able to be inclined more or less to the bracket 50, and the screw shaft portion 71a of the adjusting shaft 71 is screwed to the nut member 72. Therefore, when the adjusting shaft 71 is operated to rotate, the screw shaft portion 71a is screwed to or screwed back from the nut member 72 in accordance with a rotational direction thereof and therefore, an interval between a portion of the bracket 50 for supporting the nut member 72 and the rear face wall 21 of the lamp housing 20 is changed. Further, although the illustrated pivoting fulcrum portion 70 is constituted to be able to adjust the interval between the bracket 50 and the rear face wall 21 of the lamp housing 20, the pivoting fulcrum portion 70 can also be constituted to be unable to adjust the interval between the bracket 50 and the lamp housing 20.

The bracket 50 is formed with a large opening 51 constituting substantially a rectangular shape and support pieces 52, 53 are projected from two upper and lower edges of the opening 51 to the front side. Further, a front end portion of the support piece 52 on an upper side is formed with an axially supporting portion 52a, and a front end portion of the support piece 53 on a lower side is formed with an inserting hole 53a. Further, attaching bosses 53b, 53b, 53b are projected from a lower face of the support piece 53 on the lower side.

Figure 4:
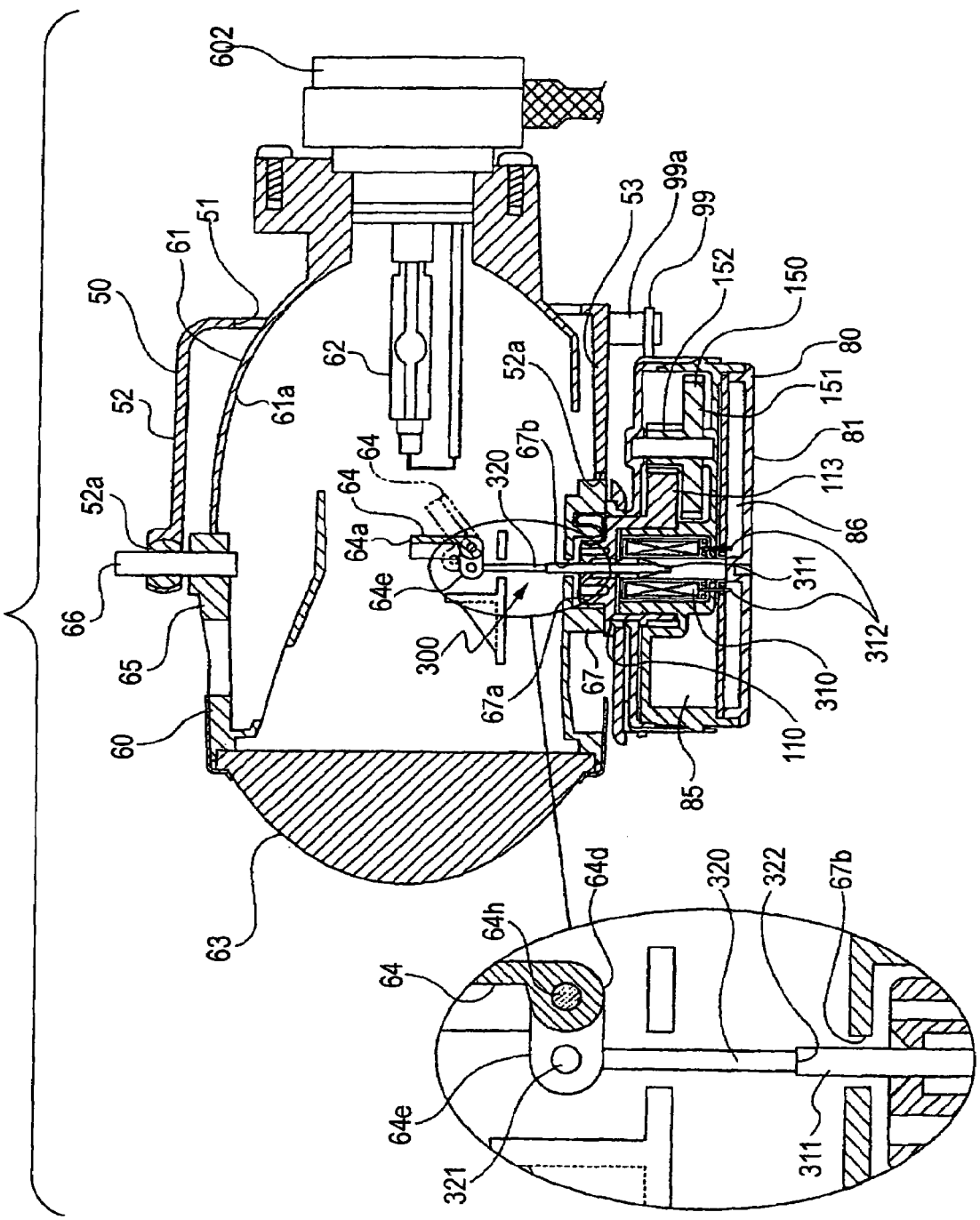
FIG. 4 is a vertical sectional view of an essential portion.

As is well known by FIG. 1 and FIG. 4, the lamp unit 60 is provided with a reflector 61 and a light source bulb 62 supported by the reflector 61 and a projecting lens 63 provided to cover a front side of the reflector 61 and a shade 64 for limiting an upper edge of a pattern (light distribution pattern) of irradiated light. The reflector 61 is provided with a reflecting face 61a having a light converging property and the projecting lens 63 constituted by a shape of a convex lens is supported by a front end portion of the attaching frame 65 substantially in a cylindrical shape fixed to a front end portion of the reflector 61.

Light emitted from the light source bulb 62 and reflected by the reflecting face 61a of the reflector 61 is converged to a vicinity of an upper edge 64a of the shade 64. Further, a focal point of the projecting lens 63 is disposed at a vicinity of the upper edge 64a of the shade 64. Therefore, a beam an upper edge of a light distribution pattern of which is limited by the upper edge 64a of the shade 64 is irradiated to the front side by the projecting lens 63.

The shade 64 is movably provided, the upper edge 64a is moved between a light blocking position disposed at the light converging region and a light nonblocking position at which reflected light by the reflector 61 is not blocked thereby to enable to selectively irradiate a dipped beam the upper edge of the light distribution patter of which is limited by the cutoff line and a running beam of a light distribution pattern which is not provided with the cutoff line for limiting the upper edge.

Figure 3:
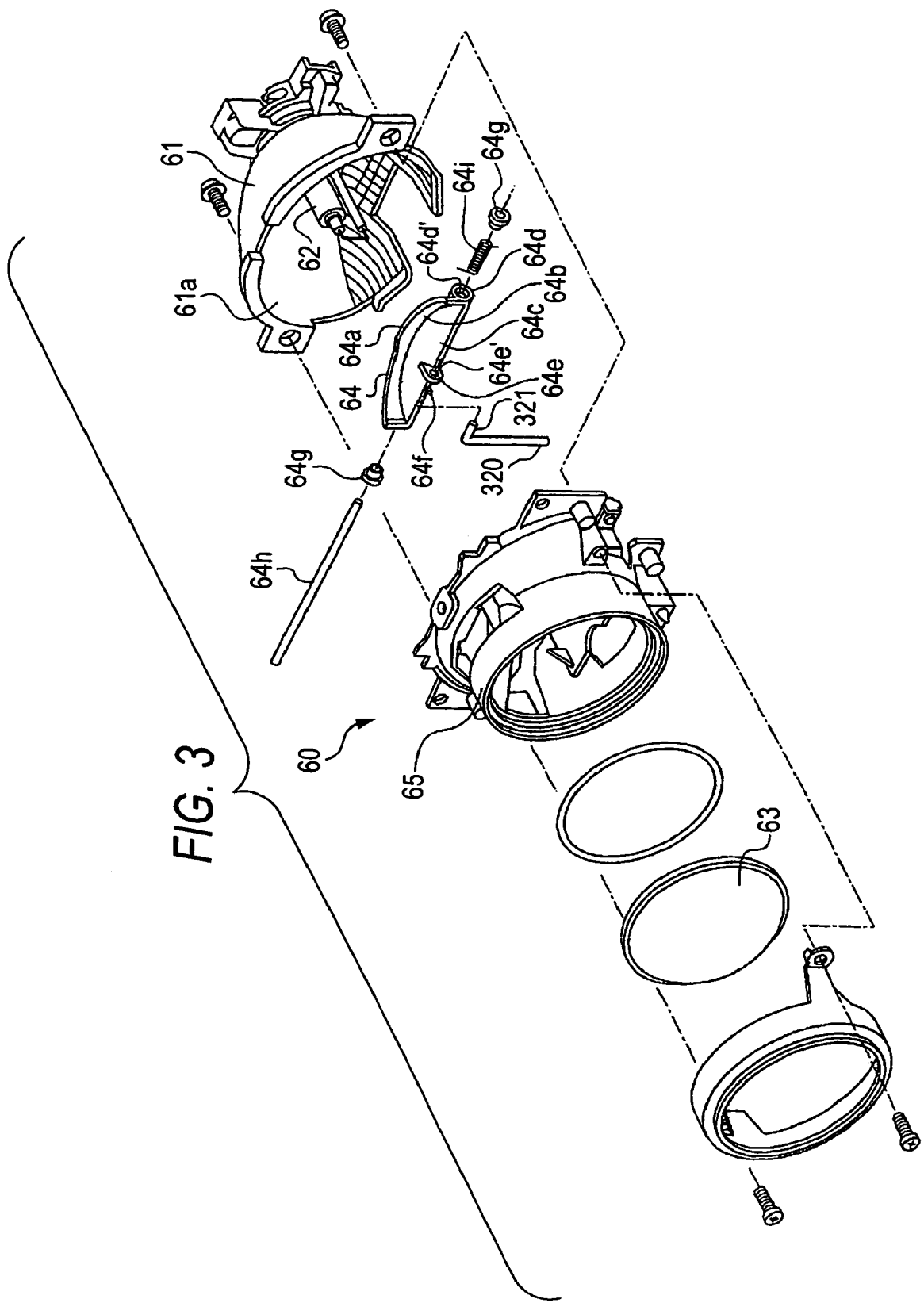
FIG. 3 is a disassembled perspective view of the lamp unit.

As is well known by FIG. 3, the shade 64 is integrally formed with a light blocking portion 64b having an upper edge 64a for forming the cutoff line, a bottom face portion 64c projected from a lower end edge of the light blocking portion 64b to the front side, supported pieces 64d, 64d (only one of which is shown in FIG. 3) projected from both ends of a portion of bonding the light blocking portion 64b and the bottom face portion 64c to a skewed lower rear side, a connecting piece 64e projected to the front side from substantially a center in a left and right direction of a front end edge of the bottom face portion 64c, and a drawout preventing piece 64f projected at a position of the front end edge of the bottom face portion 64c proximate to the connecting piece 64e.

Further, a support shaft 64h both ends of which are supported by support members 64g, 64g supported by two left and right side portions of a front end portion of the reflector 61 is inserted into holes 64d', 64d' of the support pieces 64d, 64d to thereby support the shade 64 pivotably by the reflector 61. Further, a torsional coil spring 64i is inserted between one of the support members 64g and the supported member 64d, thereby, the shade 64 is urged by a pivoting force in the counterclockwise direction in view from FIG. 4. Further, details of pivoting movement of the shade 64 will be described later.

As is well known by FIG. 4, a rear end portion of the attaching frame 65 is pivotably supported by an axially supporting portion 52a of the upper support piece 52 of the bracket 50 by a fulcrum shaft 66. Further, a connecting boss 67 is projected to a lower side from a lower face of a rear end portion of the attaching frame 65. Further, the connecting boss 67 is formed with a connecting recess portion 67a (refer to FIG. 4) opened to a lower side. Further, a center of the connecting recess portion 67a and a center of the fulcrum shaft 66 are coaxially disposed. Further, a center portion of the connecting boss 67 is formed with an inserting hole 67b for communicating inside and outside of the attaching frame 65. Further, the connecting boss 67 is inserted to a lower side from the inserting hole 53a of the support piece 53 on the lower side of the bracket 50. Further, a rear end portion of the lamp unit 60 is projected to a rear side from the opening 51 of the bracket 50. In this way, the lamp unit 60 is pivotably supported by the bracket 50 in the horizontal direction.

An irradiated light control apparatus 80 integrally assembled with a horizontal driving device for pivoting the lamp unit 60 in the horizontal direction, a vertical driving device for pivoting the lamp unit 60 in the vertical direction, and a switching drive portion of a light amount changing device for changing an irradiating light amount of the irradiating light, that is, pivoting the shade 64 between the light blocking position and the light nonblocking position is supported by a lower side of the support piece 53 on the lower side of the bracket 50.

As is known from FIG. 4 through FIG. 9, the irradiated light control apparatus 80 is integrally assembled with a horizontal driving device 100, the vertical driving device 200, and a switching drive portion 310 of a light amount changing device 300 in a single case 81.

The case 81 is constituted by three portions. That is, the case 81 is constituted by bonding a main case member 90, an upper case member 82 covering an upper face of the main case member 90, and a lower case member 83 covering a lower face of the main case member 90.

Figure 8:
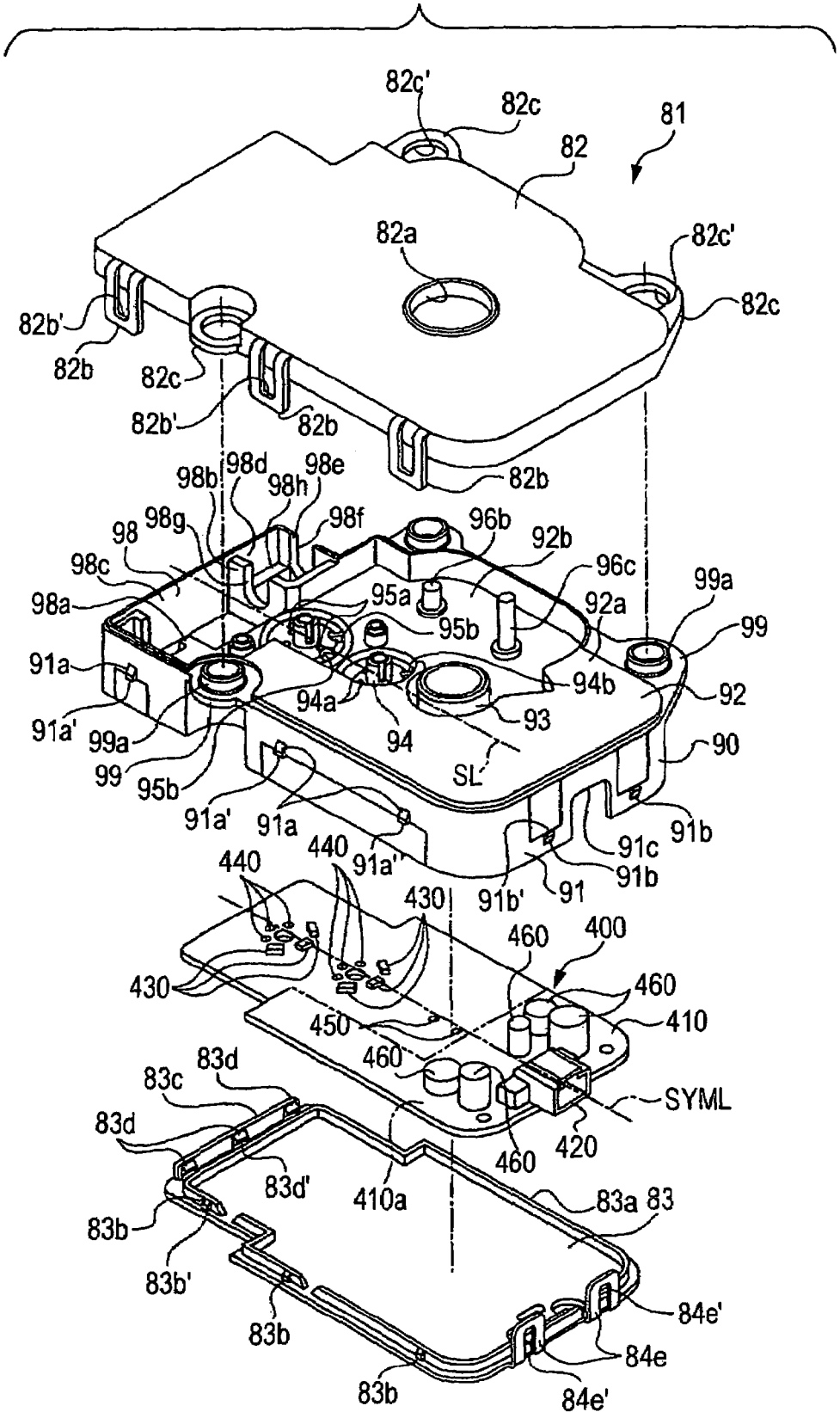
FIG. 8 is a disassembled perspective view of a case.

As is well known by FIG. 8, the main case member 90 is constituted by a substantially laterally prolonged rectangular shape in a plane shape thereof, including a peripheral wall 91 for surrounding a surrounding thereof, and formed with a middle wall 92 for partitioning in an up and down direction a portion thereof surrounded by the peripheral wall 91 at a portion thereof excluding one side portion (left side portion of the irradiated light control apparatus with regard to an lamp unit arranged on a right side. Further, an explanation will be given here of an irradiating light control apparatus 80R with regard to the lamp unit arranged on the right side). A portion 92a in an inverse L-like shape substantially from a front side portion over to a right side portion of the middle wall 92 is made to constitute a high base portion having a height the same as that of an upper end of the peripheral wall 91 and the other portion 92b is made to constitute a middle portion disposed at a height proximate to a lower end of the peripheral wall 91.

A support cylinder 93 constituted by a shape of a slightly bold circular cylinder is projected to the upper side from the middle portion 92b at a position slightly proximate to a right side of a center of the main case member 90. Support cylinders 94, 95 constituted by a shape of two slightly slender cylinders are projected to the upper side from the middle portion 92b to align in a left and right direction on a left side of the support cylinder 93. Respective four pieces of inserting holes 94a, 94a, . . . , 95a, 95a, . . . , are formed on circumferences centering on the respective support cylinders 94, 95, further, respective three pieces of facing holes 94b, 94b, 94b, 95b, 95b, 95b are formed on circumferences disposed on outer sides of the inserting holes and centering on the support cylinders 94, 95. Each of the support cylinders 93, 94, 95 is disposed on a line SL which passes through around the center of the main case member 90 and extends laterally. Further, the inserting holes 94a, 94a, . . . , 95a, 95a, . . . , and the facing holes 94b, 94b, 94b, 95b, 95b, 95b, are arranged in line symmetry by constituting an axis of symmetry by a straight line SL arranged with the respective support cylinders 93, 94, 95. Otherwise, support shafts 96a, 96b, 96c, 97 are projected to the upper side from the middle portion 92b.

A left end portion of the main case member 90 which is not formed with the middle wall 92 is formed with a space 98 constituted by a rectangular shape prolonged in a front and rear direction, a bottom portion of the space 98 is closed by a bottom face wall 98a, further, partitioned into two front and rear chambers 98c, 98d by a partition wall 98b formed to be proximate to a rear end thereof. Further, a rear end wall 98e for limiting a rear end of the space 98 and the partition wall 98b are formed with notches 98f, 98g substantially in a U-like shape respectively opened at upper ends thereof. Further, both end portions of the chamber 98d on the rear side are formed with guiding difference faces 98h, 98h directed to the upper side. Further, the space 98 is formed in a state of being inclined to a rear upper side relative to the middle wall 92 of the case member 90, a main face of the upper case member 82 and a main face of the lower case member 83 (further, the respective faces are disposed substantially horizontally when the lamp unit 60 is disposed at a middle position). Further, an inclination of the space 98 will be explained later in details.

An outer peripheral portion of the main case member 90 is formed with three attaching portions 99, 99, 99 and the attaching portions 99, 99, 99 are formed with cylinder members 99a, 99a, 99a having a short length. Further, an outer peripheral face of the peripheral wall 91 is projected with engaging claws 91a, 91a, . . . , in which engaging faces 91a', 91a', . . . are directed to the lower side and engaging claws 91b, 91b in which engaging faces 91b', 91b' are directed to the upper side.

Further, substantially a center in the front and rear direction of the right side portion of the peripheral wall 91 is formed with a substantially rectangular notch 91c opened at a lower edge thereof.

The upper case member 82 is constituted by a shape of a plate in a shape of covering the upper side of the main case member 90 substantially completely, and formed with an inserting hole 82a in a circular shape a center of which coincides with an axis center of the support cylinder 93 of the main case member 90 at a position substantially proximate to the center. A peripheral edge portion of the upper case member 82 is formed with engaging pieces 82b, 82b, . . . projected to a lower side, and the engaging pieces 82b, 82b, . . . are formed with engaging holes 82b', 82b', . . . . Further, the peripheral edge portions of the upper case member 82 is formed with attaching portions 82c, 82c, 82c, and the attaching portions 82c, 82c, 82c are formed with inserting holes 82c', 82c', 82c'.

Further, the upper case member 82 is disposed to cover the upper side of the main case member 90, and the cylinder members 99a, 99a, 99a of the attaching portions 99, 99, 99 of the main case member 90 are inserted into the inserting holes 82c', 82c', 82c' of the attaching portions 82c, 82c, 82c of the upper case member 82 from the lower side. Further, when the engaging pieces 82b, 82b, . . . of the upper case member 82 are moved to the lower side along the peripheral wall 91 of the main case member 90, front ends of the engaging pieces 82b, 82b, . . . slide on inclined faces of the engaging claws 91a, 91a, . . . formed at an outer face of the peripheral wall 91 to be bent to outer sides, and, finally 82b', 82b', 82b' engage with the engaging faces 91a', 91a', . . . directed to a lower side of the engaging claws 91a, 91a, . . . In this way, the upper case member 82 is attached to the upper side of the main case member 90. Further, a large space is formed between the middle portion 92b of the middle wall 92 of the main case member 90 and the upper case member 82, and the space is arranged with a mechanism part of a gear or the like to constitute a mechanism portion 85. Further, also an upper side of the space 98 formed at the left side portion of the main case member 90 is covered by the upper case member 82. Further, when the space 98 is covered by the upper case member 82, inside of the chamber 98d is formed with a plurality of guide grooves extended substantially in the front and rear direction by guide portions, not illustrated, formed at portions of the upper case member 82 in correspondence with the chamber 98d.

The lower case member 83 is constituted by a shape of a plate having a shape covering a large portion of a lower face of the main case member 90, and formed with an erected wall 83a having a low height slightly on an inner side of an outer peripheral portion thereof. Further, an outer peripheral face of the erected wall 83a is projected with engaging claws 83b, 83b, . . . in which engaging faces 83b', 83b' . . . are directed to a lower side. Further, an engaging wall 83c is erected at a left end portion of the lower case member 83 at a position remote from the erected wall 83 to an outer side, and a right side face of the engaging wall 83c is projected with engaging claws 83d, 83d, 83d in which engaging faces 83d', 83d', 83d' are directed to a lower side. Further, engaging pieces 84e, 84e having engaging holes 84e', 84e' are projected from the outer peripheral portion of the lower case member 83 to direct to the upper side.

Further, when the lower case member 83 is moved slightly to the upper side in a state in which the lower case member 83 is disposed to cover the lower side of the main case member 90, the engaging holes 83e', 83e' of the engaging pieces 83e, 83e are engaged with the engaging faces 91b', 91b' of the engaging claws 91b, 91b formed at the outer face of the peripheral wall 91 of the main case member 90, further, the engaging faces 83b', 83b' and 83d', 83d', 83d' of the engaging claws 83b, 83b, . . . and 83d, 83d, 83d of the lower case member 83 are engaged with engaging portions, not illustrated, formed at an inner face of the peripheral wall 91 of the main case member 90, thereby, the lower case member 83 is attached to the main case member 90 to cover the lower face. Further, a space between the middle wall 92 of the main case member 90 and the lower case member 83 is arranged with a circuit board, mentioned later, to constitute a circuit portion 86.

Figure 5:
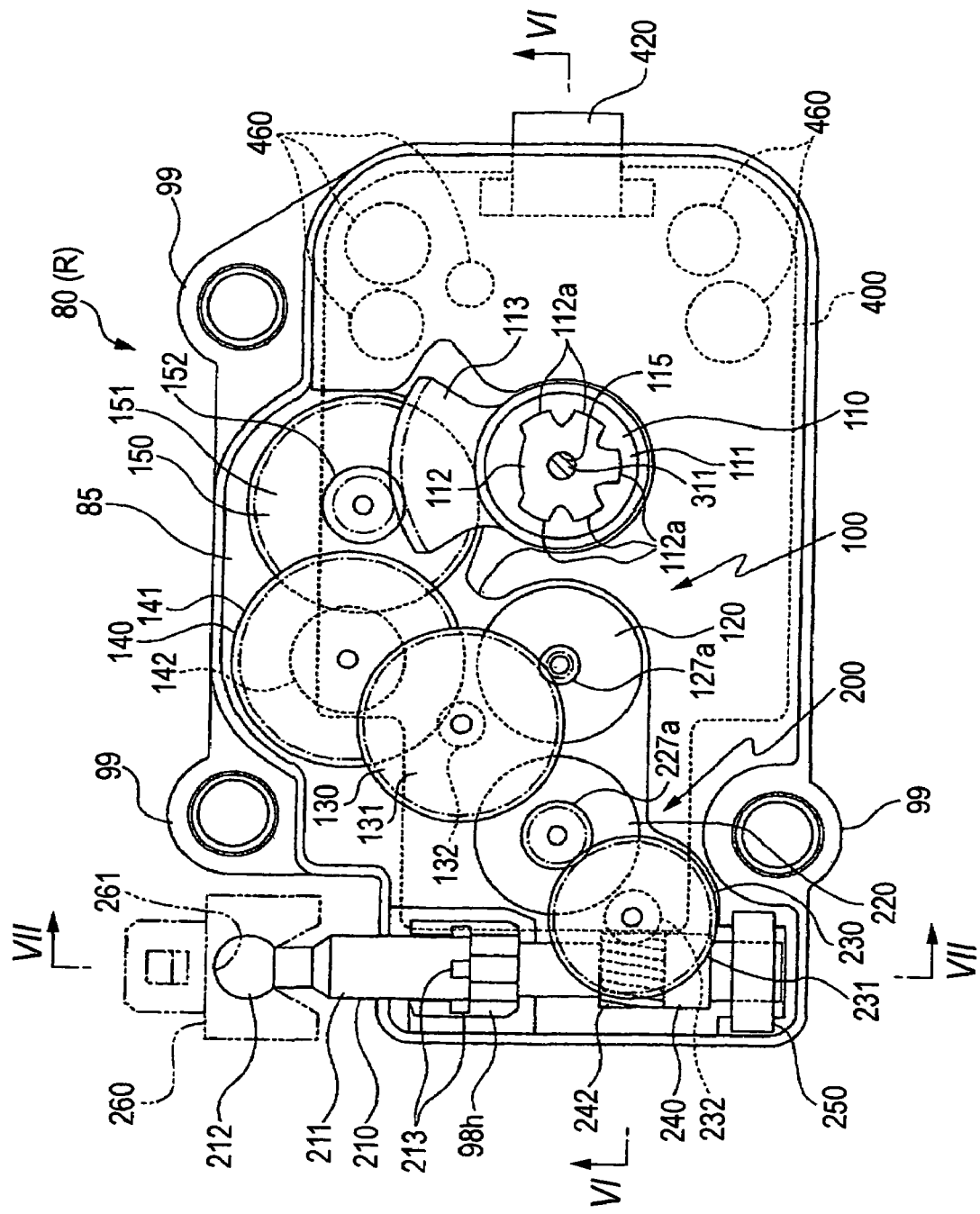
FIG. 5 is a plane view showing an irradiating light control apparatus by removing an upper case member.
Figure 6:
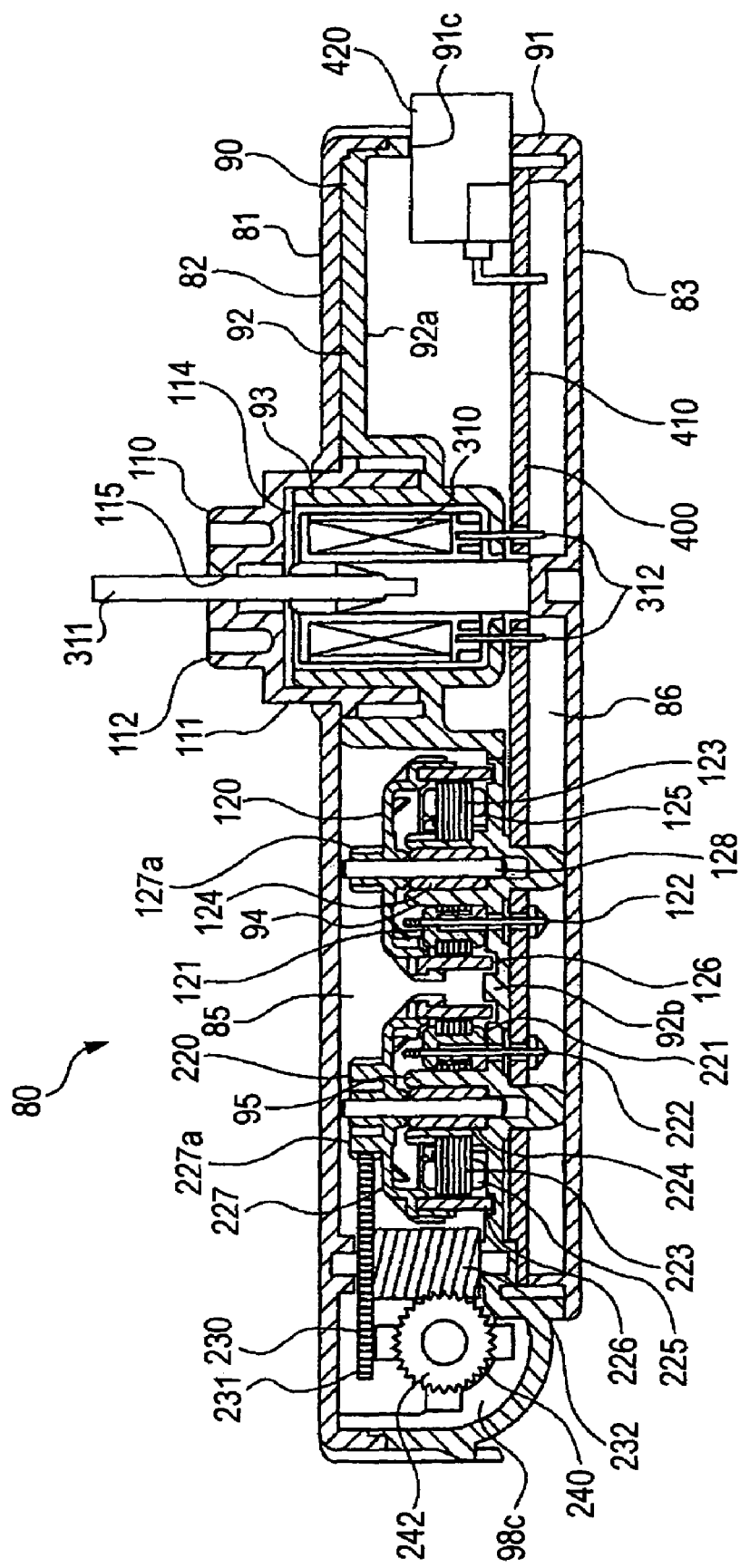
FIG. 6 is a sectional view cutting to show the irradiating light control apparatus by a line VI-VI of FIG. 5.
Figure 9:
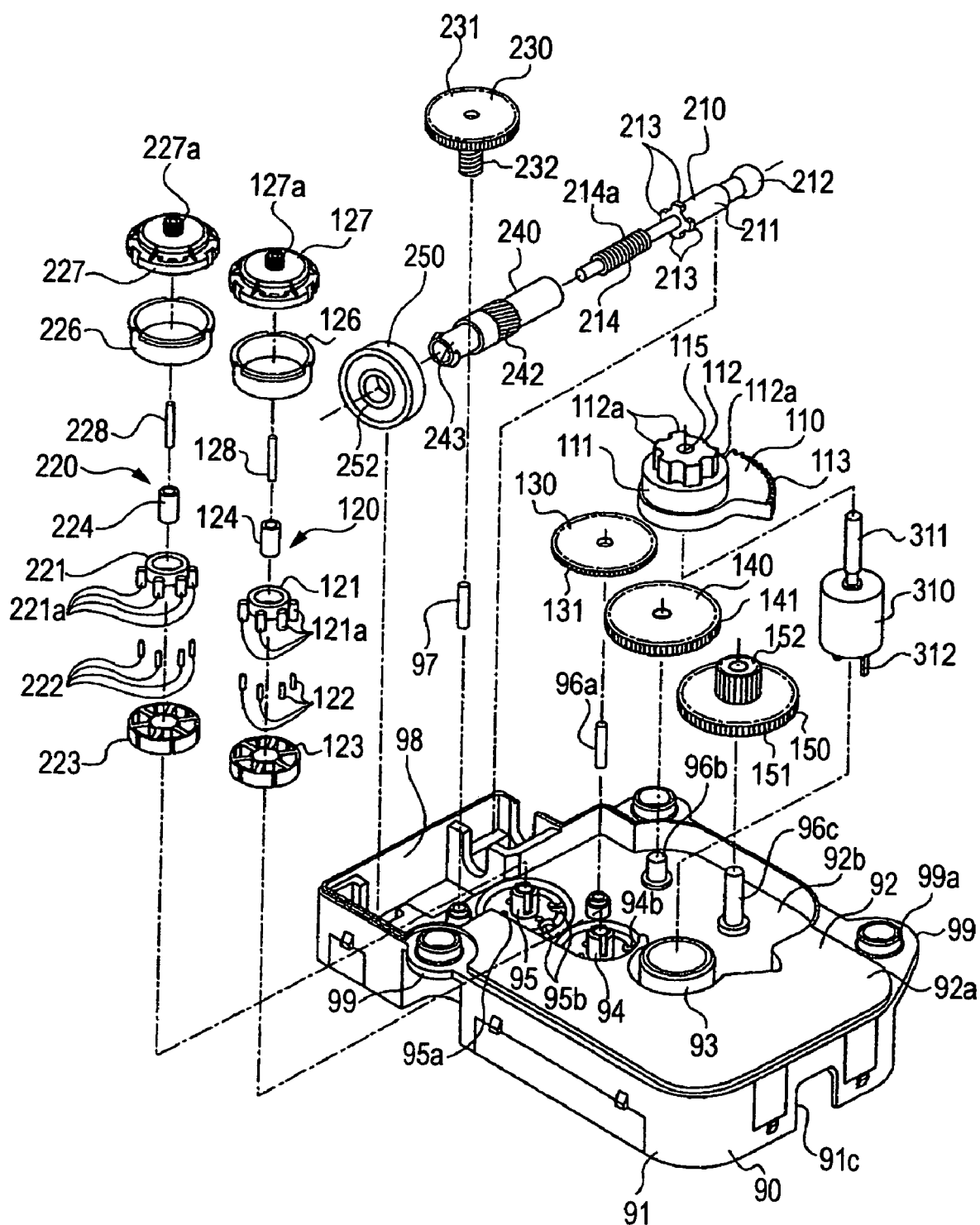
FIG. 9 is a disassembled perspective view of a mechanism portion.

As is well known by FIG. 5, FIG. 6, FIG. 9, the horizontal driving device 100 includes a horizontal pivoting shaft 110 connected to the lamp unit 60. Further, the horizontal driving device 100 includes a horizontal direction driving motor 120 as a drive source, and rotation of the motor 120 is transmitted to the horizontal pivoting shaft 110 by way of reduction gears 130, 140, 150.

The horizontal pivoting shaft 110 is formed with a connecting portion 112 at an upper end of a main portion 111 substantially in a cylindrical shape, further, a sector gear 113 is projected in side direction from a lower end portion thereof. An outer side face of the connecting portion 112 is formed with a plurality of engaging projected streaks 112a, 112a. . . . Further, an inner portion of the horizontal pivoting shafts 110 is formed with a large space 114 in a shape of a circular pillar, and the circular pillar shape space 114 is communicated with outside by an inserting hole 115 formed at an upper end face of the connecting portion 112. Further, the rotating shaft 110 is rotatably supported by the support cylinder 93 erected at the middle wall 92 of the main case member 90 in a state of being outwardly fitted with the circular pillar shape space 114.

The horizontal direction driving motor 120 comprises a stator portion fixed to the main case member 90 and a rotor portion rotatable relative to the stator portion, and the stator portion is constituted by an insulator 121 fixed to the support cylinder 94 of the main case member 90 in an outwardly fitted state, 4 pieces of terminals 122, 122, . . . press-fittedly fixed to support pipes 121a, 121a, . . . of the insulator 121 and lower portions of which pass through holes 94a, 94a . . . formed on the middle wall 92 to reach the space of the circuit portion 86, a core 123 arranged to surround the insulator 121, a bearing metal 124 press-fittedly fixed to the support cylinder 94 formed at the main case member 90 and a coil 125 (refer to FIG. 6) wound around the core 123.

The rotor portion of the motor 120 is constituted by a rotor magnet 126 substantially constituted by a shape of a cylinder having a short length in an axis direction, a gear portion 127 fixed to cover an upper end of the rotor magnet 126 and a shaft 128 hung down to the lower side from a center of the gear portion 127, and a center of an upper face of the gear portion 127 is formed with a pinion 127a. Further, the horizontal direction driving motor 120 is formed by rotatably inserting the shaft 128 of the rotor into the bearing metal 124. Further, a lower end of the rotor magnet 126 is made to face the space of the circuit portion 86 disposed on the lower side of the middle wall 92 by way of the facing holes 94b, 94b, 94b formed at the middle wall 92 of the main case member 90.

The reduction gear 130 includes a large gear 131 and a small gear 132 integrally formed with a lower side of the large gear 131 and is rotatably supported by the support shaft 96a erected at the main case member 90, and the large gear 131 is brought in mesh with the pinion gear 127a of the motor 120. The middle reduction gear 140 includes a large gear 141 and a small gear 142 integrally formed with a lower side of the large gear 141 and is rotatably supported by the support shaft 96b erected at the main case member 90 and the large gear 141 is brought in mesh with the small gear 132 of the reduction gear 130. The reduction gear 150 includes a large gear 151 and a small gear 152 formed integrally with an upper side of the large gear 151 and is rotatably supported by the support shaft 96c erected at the main case member 90, the large gear 151 is brought in mesh with the small gear 142 of the middle reduction gear 140, and the small gear 152 is brought in mesh with the sector gear 113 of the horizontal pivoting shaft 110. Therefore, when the motor 120 is driven, rotation thereof is transmitted to the sector gear 113 by way of the three reduction gears 130, 140,150, thereby, the horizontal pivoting shaft 110 is pivoted.

The connecting portion 112 of the horizontal pivoting shaft 110 is inward-fittingly connected to the connecting recess portion 67a of the connecting boss 67 provided at the lower face of the lamp unit 60, further, the engaging projected streaks 112a, 112a, . . . are engaged with recess streaks, not illustrated, formed at an inner peripheral face of the connecting recess portion 67a to prevent the connecting portion 112 of the horizontal pivoting shaft 110 and the connecting boss 67 of the lamp unit 60 from being slipped in a rotational direction.

The vertical driving device 200 includes a leveling output shaft 210 and a vertical direction driving motor 220 for moving the leveling output shaft 210 along an axial direction thereof, further, rotation of the motor 220 is converted into movement in the axial direction of the leveling output shaft 210 by way of a transmission gear 230 and a gear shaft 240.

The leveling output shaft 210 includes a spherical member 212 for a ball joint at a rear end of a main portion 211 substantially constituted by a shape of a circular pillar, and guided projections 213, 213 are projected to outsides at a front end of the main portion 211. A screw shaft portion 214 is projected from the front end of the main portion 211 to the front side and an outer peripheral face of the screw shaft portion 214 is formed with a screwed streak 214a.

The gear shaft 240 is substantially constituted by a shape of a circular cylinder, an inner peripheral face of the circular cylinder is formed with a screwed groove 241 (refer to FIG. 6), and a rear half portion of an outer peripheral face is formed with a bevel gear 242. Further, a front end portion 243 of the gear shaft 240 is formed by a slightly slender diameter.

A ball bearing 250 is fixed to a front end portion of the chamber 98c on the front side of the space 98. Further, the front end portion 243 of the gear shaft 240 is press-fittingly fixed to an inner lace 251 of the ball bearing 250. Thereby, the gear shaft 240 is rotatably arranged at inside of the chamber 98c of the space 98. Further, the screw shaft portion 214 of the leveling output shaft 210 is screwed to the screw groove 241 formed at the inner peripheral face of the gear shaft 240. Under the state, the spherical member 212 of the leveling output shaft 210 is projected from the notch 98f of the rear end wall 98e, and the guided projections 213, 213, . . . are slidably engaged with guide grooves, not illustrated, formed by the guiding stepped difference faces 98h, 98h at inside of the chamber 98d on the rear side. Therefore, when the gear shaft 240 is rotated, the leveling output shaft 210 is not rotated by slidably engaging the guided projections 213, 213, . . . with the guide grooves at inside of the chamber 98d but is moved on the rear side or the front side in accordance with the rotational direction of the gear shaft 240 by feeding the screwed streak 214a of the screwed shaft portion 214 by the screwed groove 241 of the gear shaft 240.

The vertical direction driving motor 220 comprises a stator portion fixed to the main case member 90 and a rotor portion rotatably relative to the stator portion, the stator portion is constituted by an insulator 221 outward-fittingly fixed to the support cylinder 95 of the main case member 90, 4 pieces of terminals 222, 222, . . . press-fittingly fixed to support pipes 221a, 221a, . . . of the insulator 221, inserted into the inserting holes 95a, 95a, . . . formed at the middle wall 92 at lower end portions thereof and reaching the space of the circuit portion 86, a core 223 arranged to surround an insulator 221, a bearing metal 224 press-fittingly fixed to the support cylinder 95 formed at the main case member 90 and a coil 225 (refer to FIG. 6) wound around the core 223.

The rotor portion of the motor 220 is constituted by a rotor magnet 226 substantially constituted by a shape of a circular cylinder having a short length in an axial direction, a gear portion 227 fixed to cover an upper end of the rotor magnet 226 and a shaft 228 hung to the lower side of a center of the gear portion 227, and a center of an upper face of the gear portion 227 is formed wit a pinion gear 227a. Further, the shaft 228 of the rotor is rotatably inserted into the bearing metal 224 to form the vertical direction driving motor 220. Further, a lower end of the rotor magnet 226 faces the space of the circuit portion 86 disposed on the lower side of the middle wall 92 by way of the facing holes 95b, 95b, 95b formed at the middle wall 92 of the main case member 90.

The transmission gear 230 is constituted by integrally forming a worm gear 232 at a lower end of a spur gear 231 and is rotatably supported by the support shaft 97 erected from the middle wall 92 of the main case member 90. Further, the spur gear 231 of the transmission gear 230 is brought in mesh with the pinion gear 227a of the motor 220 and the worm gear 232 is brought in mesh with the bevel gear 242 of the gear shaft 240. Therefore, when the vertical direction driving motor 220 is driven, rotation is transmitted to the gear shaft 240 by way of the transmission gear 230 and the gear shaft 240 is rotated. Further, when the gear shaft 240 is rotated, the leveling output shaft 210 is moved to the rear side or the front side.

The light amount changing device 300 is constituted by a switching drive portion 310 and a connecting rod 320 for connecting the shade 64 and the switching drive portion 310 other than the shade 64. Further, the switching drive portion 310 is integrated into the case 81. The switching drive portion 310 is constituted as a solenoid and is arranged at inside of the support cylinder 93 formed at the main case member 90 in a state of being surrounded by the horizontal pivoting shaft 110 and the operating shaft 311 is projected to the upper side from the inserting hole 115 formed at the upper end of the horizontal pivoting shaft 110 as a switching drive shaft. Further, when electricity is conducted to the solenoid 310, the operating shaft 311 is projected from the solenoid 310, and when electricity conducted to the solenoid 310 is cut, the operating shaft 311 is drawn in a direction of inside of the solenoid 310 by springing means, not illustrated. An upper end 321 of the connecting rod 320 is folded to bend substantially in an L-like shape, the upper end 321 is inserted through the hole 64e of the connecting piece 64e of the shade 64 to be connected to the shade 64, and when the irradiating light control apparatus 80 is attached to the lower face of the lower side support piece 53 of the bracket 50, a lower end 322 of the connecting rod 320 is brought into a state of being brought into elastic contact with an upper end of the operating shaft 311 by the urging force of the torsional coil spring 64i.

A circuit board 400 is arranged at inside of the space formed between the middle wall 92 at inside of the case 81 and the lower case member 83 to constitute the circuit portion 86. As is well known by FIG. 8 or the like, the circuit board 400 is constituted by forming a printed wiring, not illustrated, at a printed base 410 and mounting a connector 420 and various electronic parts. The printed base 410 is constituted by a shape symmetrical in the front and rear direction and is arranged with a connecting land or the like of respective parts and the printed wiring such that the connector 420, the solenoid 310, the two motors 120, 220 are arranged on a symmetry axis SYML dividing the front and rear direction by two. For example, Hall element 430, 430, . . . , for detecting rotation of the rotor magnets 126, 226 of the respective motors 120, 220 are arranged in line symmetry in the front and rear direction on the symmetric axis SYML by single pieces thereof, and single pieces thereof at positions remote from the symmetric axis SYML in the front and rear direction at equal intervals, further, the inserting holes 440, 440, . . . for inserting respective four pieces of the terminals 122, 122, . . . , 222, 222, . . . of the motors 120, 220 on the lower face side of the printed base 410 to connect to a connecting land, not illustrated, formed at the lower face of the printed based 410 are arranged in line symmetry in the front and rear direction by respective four pieces of respective two pieces on the symmetry axis SYML and of respective single pieces thereof at positions remote from each other in the front and rear direction at equal intervals from the symmetry axis SYML. Further, also the inserting holes 450, 450 for inserting the terminals 312, 312 of the solenoid 310 to the lower face side of the printed base 410 to connect to a connecting land, not illustrated, formed at the lower face of the printed base 410 are arranged on the symmetry axis SYML. Further, the connector 420 is mounted to the printed base 410 at a right end of the upper face of the printed base 410 and at a center in the front and rear direction, that is, on the symmetry axis SYML.

Figure 11:
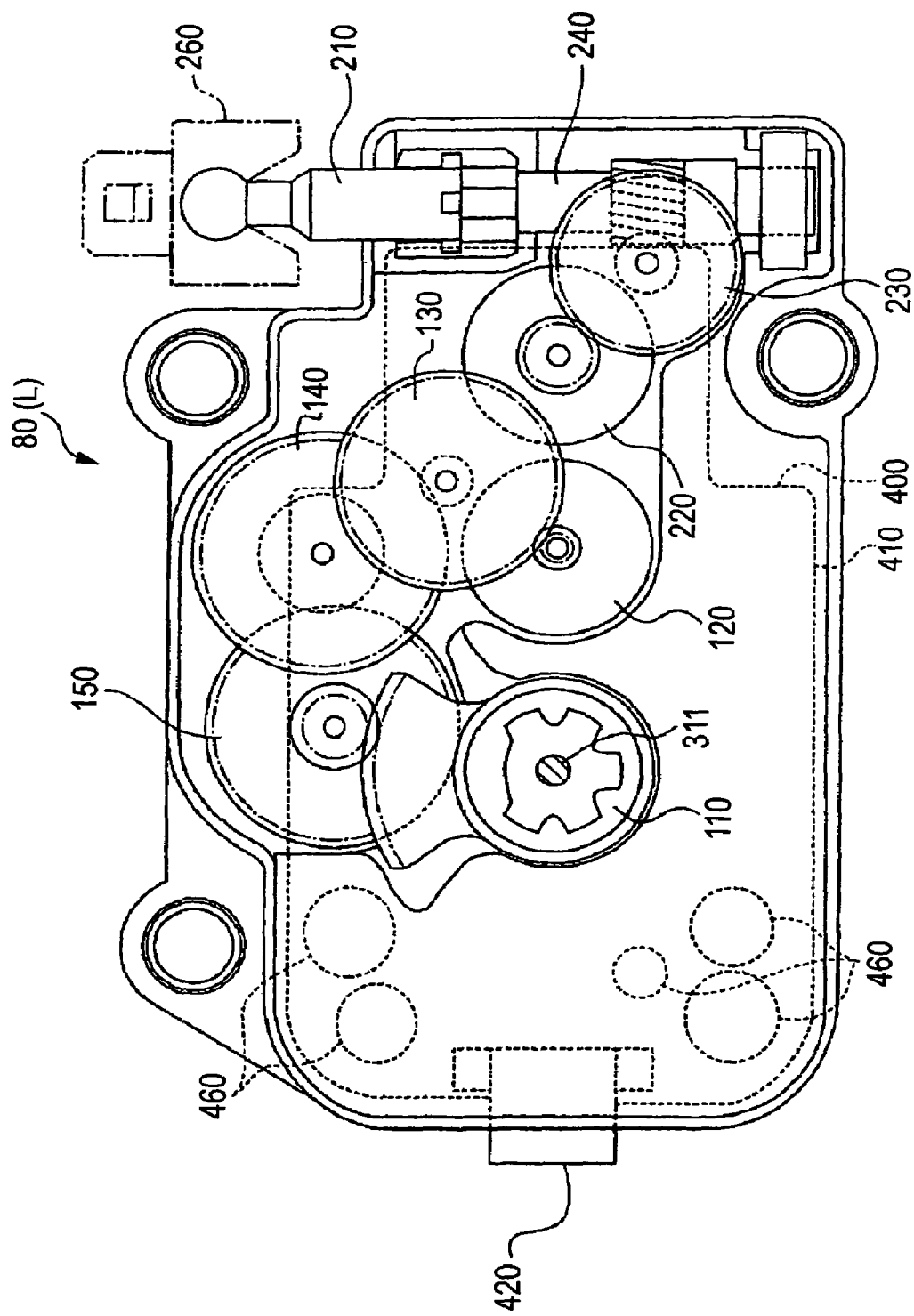
FIG. 11 is a plane view showing an irradiating light control apparatus arranged on a side opposed to a side of the irradiating light control apparatus shown in FIG. 1 through FIG. 9 by removing an upper case member.

By forming the printed base 410 of the circuit board 400 in line symmetry in the front and rear direction as described above, the horizontal pivoting shaft 110, the horizontal direction driving motor 120, the vertical direction driving motor 220 and the switching drive portion (solenoid) 310 of the light amount changing device 300 can be arranged on the symmetry axis SYML and therefore, in providing the left and right pair of the irradiating light control apparatus 80R (the above-explained irradiating light control apparatus 80 is the irradiating light control apparatus 80R arranged on the right side), 80L (refer to FIG. 11), the circuit board 400 common to the left and the right side can be used, and a number of pieces of parts can be reduced. That is, by preparing the left and right individual cases 81, 81 arranged with a cooperatively moving portion formed at the middle wall 92 of the main case member 90 for communicating members arranged on the side of the mechanism portion 85 and parts, connecting portions and the like on the circuit board 400 arranged at the circuit portion 86, for example, the inserting holes 94a, 94a, . . . , 95a, 95a, . . . and the facing holes 94b, 94b, 94b, 95b, 95b, 95b symmetrically in the front and rear direction by constituting the axis of symmetry by the imaginary straight line SL shown in FIG. 8, the same circuit boards 400 can be used on the left and on the right side by being rotated by 180 degrees in the left and right direction.

At the middle wall 92 of the main case member 90, the portion 92a in the inverse L-like shape substantially from the front side portion over to the right side portion is made to constitute the high base portion having the height the same as that of the upper end of the peripheral wall 91. Therefore, a width in the up and down direction of a portion of the space of the circuit portion 86 in correspondence with the high base portion 92a is larger than a portion thereof in correspondence with the middle portion 92b and therefore, a portion 410a in correspondence with the high base portion 92a of the printed base 410 is provided with a space which is high to the upper side. Therefore, electronic parts 460, 460, ... in the electronic parts mounted on the printed base 410 having large heights may be mounted on the portion 410a. By arranging the electronic parts 460, 460, ... having the large heights at a vicinity of a portion needing a space which is high on the upper side as in the portion of arranging the connector 420, a thickness of a total of the case 81 can be made to be thinner than in a case of being arranged at a portion which is not provided with allowance on the upper side of the printed base 410.

The circuit portion 86 is formed by arranging the circuit board 400 constituted as described above at the space formed between the main case member 90 and the lower case member 83 of the case 81. Further, the connector 420 faces in an outer direction from the notch 91c formed on the right side portion of the peripheral wall 91 of the main case member 90. Further, the terminals 122, 122, ..., 222, 222, ... of the motors 120, 220 are inserted through the inserting holes 440, 440, ... of the printed base 410 to the lower face side of the of the printed base 410 and connected to a connecting land, not illustrated, formed at the lower face of the printed base 410 by soldering or the like. Further, the Hall elements 430, 430, ... on the circuit board 400 are brought into a state of being opposed to be proximate to lower ends of the rotator magnets 126, 226 of the respective motors 120, 220 by way of the facing holes 94b, 94b, 94b, 95b, 95b, 95b formed at the middle wall 92 of the main case member 90. Further, the terminals 312, 312 of the solenoid 310 are inserted through the inserting holes 450, 450 of the printed base 410 to the lower face side of the printed base 410 and connected to a connecting land, not illustrated, formed at the lower face of the printed base 410 by soldering or the like.

Figure 10:
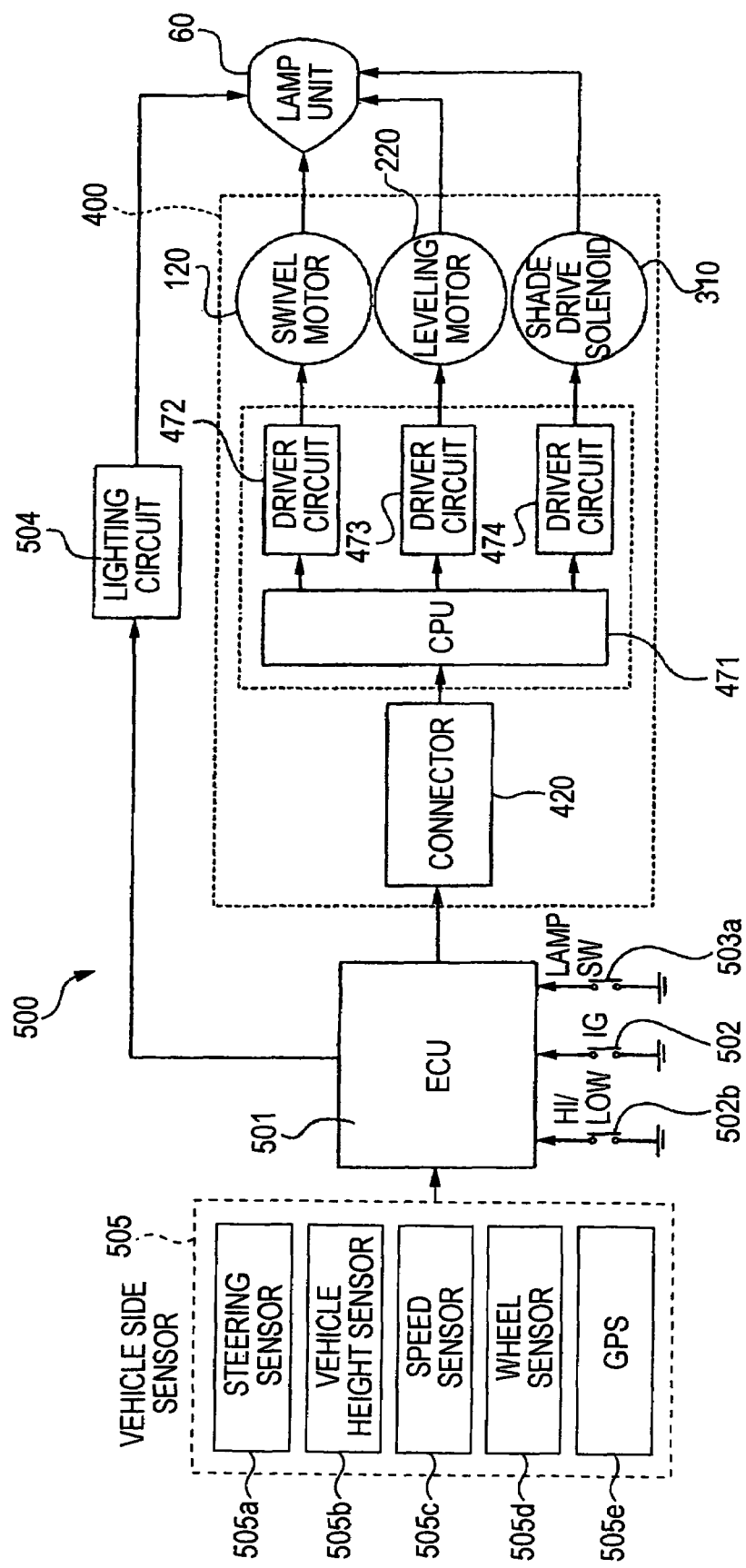
FIG. 10 is a block diagram of a control circuit.

FIG. 10 shows an example 500 of a control circuit for controlling a total of a headlamp system including the lamp unit 60.

The control circuit 500 includes ECU 501 for controlling the total of the headlamp system including the lamp unit 60, and the ECU 501 is connected with an ignition switch 502 and a lamp switch 503a and a light distribution switching switch 503b. Further, when the lamp switch 503a is turned on (ON) in a state of turning on (ON) the ignition switch 502, an igniting instruction is issued from ECU 501 to an igniting circuit 504, thereby, the light source bulb 62 of the lamp unit 60 is lighted by the igniting circuit 504, a beam having a predetermined light distribution pattern is irradiated to the front side, further, when the light distribution switching switch 503b is operated in the state of igniting the light source bulb 62, the light distribution is switched by controlling the position of the shade 64 in accordance with the operation.

The ECU 501 is inputted with signals from various sensors 505. For example, signals from a steering sensor 505a, a vehicle height sensor 505b, a vehicle speed sensor 505c, a wheel sensor 505d, and a GPS sensor 505e are inputted thereto. The ECU 501 is respectively inputted with information with regard to a steering direction and a steering angle when steering is operated from the steering sensor 505a, information with regard to respective heights of front and rear axles from the vehicle height sensor 505b, information with regard to a vehicle speed from the vehicle speed sensor 505c, information with regard to rotational numbers of respective wheels from the wheel sensor 505d, and current position information based on the global position measuring system from the GPS sensor 505e. Further, ECU 501 outputs a predetermined control signal to the irradiating light control apparatus 80 based on information from the respective sensors 505 and the irradiating light control apparatus 80 receives power feeding and the control signals from ECU 501 by way of the single connector 420. In this way, power feeding and(/or) the control signal are supplied to the irradiating light control apparatus 80 by way of the single connector 420 and therefore, a circuit constitution of the irradiating light control apparatus 80 is simplified, a supply line of power feeding and the control signal is summarized to the single piece, and wiring of the supply line at inside of the housing 10 is facilitated.

CPU (central processing unit) 471 integrated with a control program is mounted on the circuit board 400, and the predetermined control signal is transmitted from ECU 501 to CPU 471 by way of the connector 420. CPU 471 transmits predetermined signals to respective driver circuits 472, 473, 474 constituted on the circuit board 400 based on the control signal provided from ECU 501 and the horizontal direction driving motor 120, the vertical direction driving motor 220, the solenoid 310 are driven individually by the respective driver circuits 472, 473, 474.

The irradiating light control apparatus 80R is attached to the lower face of the lower side support piece 53 of the bracket 50. That is, the attaching bosses 53b, 53b, 53b projected from the lower face of the support piece 53 are inserted into the cylinder members 99a, 99a, 99a of the attaching portions 99, 99, 99 of the irradiating light control apparatus 80R, the irradiating light control apparatus 80R is positioned to the support piece 53 and under the state, the irradiating light control apparatus 80R is attached to the lower face of the support piece 53 by pertinent means of screwing or the like.

When the irradiating light control apparatus 80R is attached to the lower face of the lower side support piece 53 of the bracket 50 as described above, the connecting portion 112 of the horizontal pivoting shaft 110 of the horizontal driving device 100 is inward-fittingly connected to the connecting recess portion 67a of the connecting boss 67 of the lamp unit 60. Further, the operating shaft 311 of the switching drive portion (solenoid) 310 of the light amount changing device 300 is inserted through the inserting hole 67b of the connecting boss 67 to be projected into the lamp unit 60 to bring about a state in which the lower end 322 of the connecting rod 320 connected to the shade 64 is brought into elastic contact with the upper end of the operating shaft 311.

Further, the spherical member 212 of the leveling output shaft 210 of the vertical driving device 200 is fitted into a spherical recess portion 261 formed at a ball receiving member 260 supported by the rear face wall 21 of the lamp housing 20 to be connected thereto in a state of a ball joint.

Figure 7:
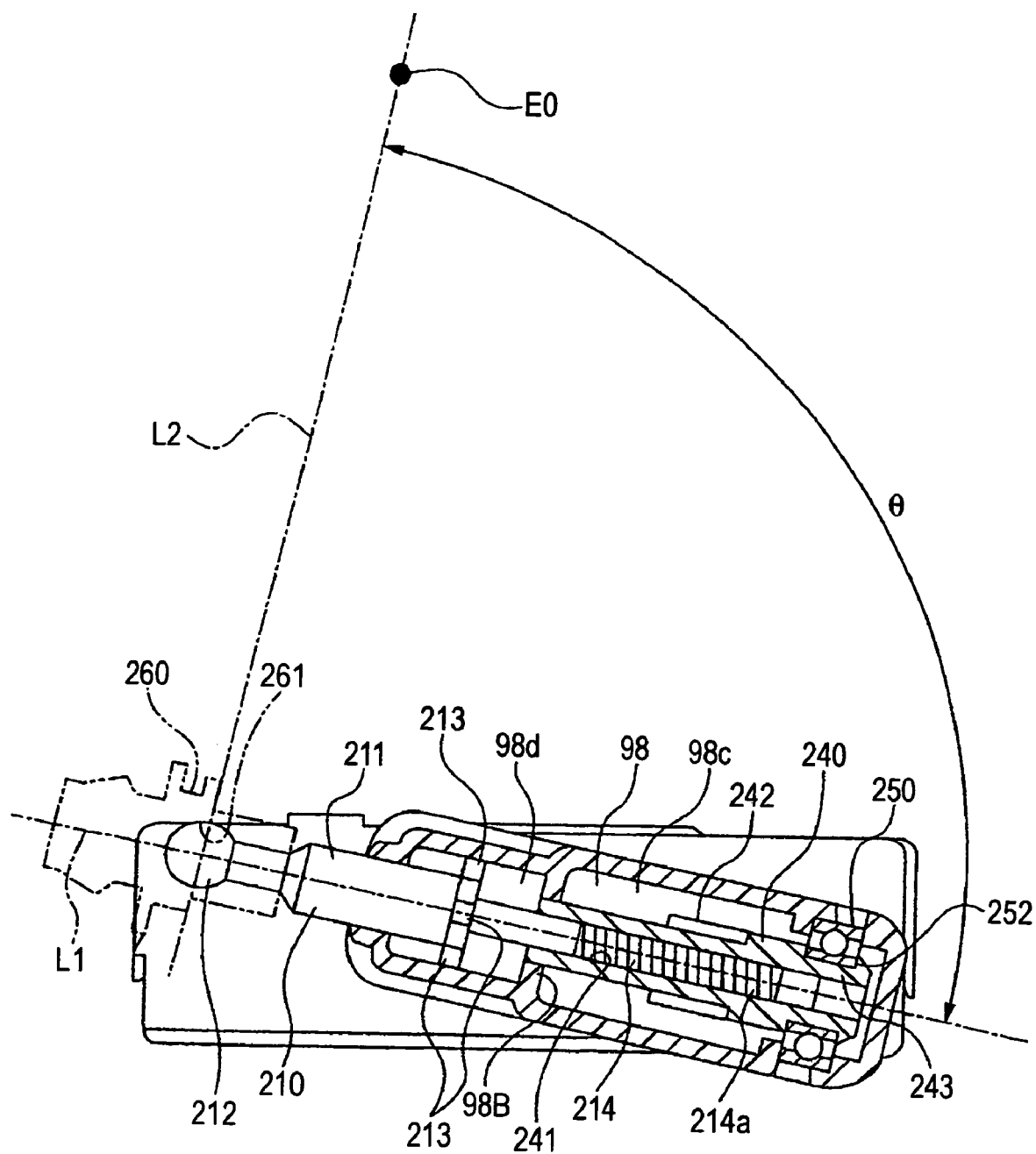
FIG. 7 is a sectional view cutting to show the irradiating light control apparatus by a line VII-VII of FIG. 5.

As described above, the axial direction of the leveling output shaft 210 is inclined to the horizontal face and an explanation will be given of the inclination. FIG. 7 shows a state in which the leveling output shade 210 is disposed substantially at a middle of a moving range. In FIG. 7, a point EO is an aiming fulcrum, that is, a pivoting fulcrum in the vertical direction of the lamp unit 60. Specifically, the point EO is a line connecting the two nut members 72 and 72 supported by the bracket 50. An angle θ made by a line L2 extended from the aiming fulcrum EO and intersected with a line L1 extended in the axial direction of the leveling output shaft 210 at the position of the spherical member 212 and the line L1 is set to substantially constitute 90°. When set in this way, a load applied on the leveling output shaft 210 in accordance with inclination of the lamp unit 60 can be reduced and an amount of projecting the vertical driving device 200 to the front side can be reduced.

A discharge bulb is used for the light source bulb 62 of the lamp unit 60 and therefore, the igniting circuit unit 600 having the igniting circuit for igniting the discharge bulb is arranged at the lower portion of the lamp body 20. A bulb socket 602 is connected to a front end of a cord 601 extended from the igniting circuit unit 600 and the bulb socket 602 is connected to the light source bulb 62. Therefore, an igniting voltage generated by the igniting circuit provided at inside of the igniting circuit unit 600 is applied on the light source bulb 62 by way of the bulb socket 602 to thereby ignite the light source bulb 62.

The operation of the headlamp 10 for an automobile will be explained as follows.

For example, when the steering sensor 505a detects operation of a steering wheel, a control amount of an amount in accordance with a direction and an angle of turning the steering wheel is outputted from CPU 471 to the driver circuit 472, and the horizontal direction driving motor 120 is driven to rotate to a predetermined direction by a predetermined amount by the driver circuit 472. Rotation of the motor 120 is transmitted to the horizontal pivoting shaft 110 by way of the reduction gears 130, 140, 150 and the pivoting shaft 110 is pivoted to the predetermined direction by the predetermined angle. The pivoting movement of the pivoting shaft 110 is transmitted to the lamp unit 60 by way of the connecting boss 67, and the lamp unit 60 is pivoted in left or right direction relative to the bracket 50.

When an inclination of a vehicle body is detected by the vehicle height sensor 505b, the vehicle speed sensor 505c, and the wheel sensor 505d and the like, in order to correct a mismatch in an irradiating angle by an inclination of the vehicle body, a control signal is outputted from CPU 471 to the driver circuit 473 to move the leveling output shaft 210 to a predetermined direction by a predetermined amount, and the driver circuit 473 drives to rotate the vertical direction driving motor 220 to a predetermined direction by a predetermined amount based on the control signal. Rotation of the motor 220 is transmitted to the gear shaft 240 by way of the transmission gear 230, by rotating the gear shaft 240, the screw streak 214a of the leveling output shaft 210 is fed by the screw groove 241, and the leveling output shaft 210 is moved to a predetermined direction by a predetermined amount. Thereby, an interval between a portion of the bracket 50 for supporting the irradiating light control apparatus 80R and the lamp housing 20 is changed, and the bracket 50 is inclined relative to the vertical direction by constituting the axis of inclination by the line connecting the nut members 72, 72 screwed with the adjusting shafts 71, 71.

In a state shown in FIG. 1 and FIG. 4, a portion of light of the light source bulb 62 is blocked by the shade 64, particularly, a beam (for example, dipped beam) in which the upper edge of the light distribution pattern is limited by the upper edge 64a of the shade 64 is irradiated. At this occasion, when the light distribution switching switch 503b is operated, a signal in accordance with the operation is transmitted from CPU 471 to the driver circuit 474, electricity is conducted to the solenoid 310 by way of the driver circuit 474, and the operating shaft 311 is projected to the upper side. When the operating shaft 311 is projected to the upper side, the connecting rod 320 is projected to the upper side by the operating shaft 311, thereby, the shade 64 is pivoted in the clockwise direction in FIG. 1, FIG. 4, and is moved to a light nonblocking position indicated by a two-dotted chain line in FIG. 4. Therefore, light of the light source bulb 62 is hardly blocked by the shade 64 and a beam (for example, running beam) which is not provided with the cutoff line at the upper edge of the light distribution pattern is irradiated. Further, when electricity conduction to the solenoid 310 is cut, the operating shaft 311 is moved in a direction of being drawn into the solenoid 310, the shade 64 is pivoted in the counterclockwise direction in FIG. 4 by the urge force of the coil spring 64i, the pivoting movement is stopped at a position at which the lower end 322 of the connecting rod 320 is stopped at the upper end 311a of the operating shaft 311 of the solenoid 310 and is stopped at the light blocking position indicated by a bold line in FIG. 1, FIG. 4.

Further, although according to the above-described explanation, there is shown an example of selectively switching to irradiate two beams of the beam in which the upper edge of the light distribution pattern is limited and the beam in which the upper edge of the light distribution pattern is not limited, the irradiating light amount can be changed by the shade 64 and therefore, a beam in which the irradiating light amount is pertinently changed by the position of the shade 64 can also be irradiated. Further, not only the solenoid but also other drive source can be used at the portion of driving to switch the light amount changing device 300. For example, when a linear motor is used, the position of the shade 64 can steplessly be changed. Further, movement of the shade 64 is not limited to pivoting movement but, for example, the shade may be moved linearly in the up and down direction, further, also the light amount changing device is not limited to the shade.

According to the headlamp 10 for an automobile, the three devices 100, 200, 310 for controlling three elements necessary for controlling irradiating light are integrally assembled to the irradiating light control apparatus 80 and therefore, the irradiating light control apparatus 80 can be constituted to be provided with a small number of pieces of parts and in a small size, thereby, a number of integrating steps of the irradiating light control apparatus 80 is reduced and the irradiating light control apparatus 80 can inexpensively constituted also owing to reduction in the number of pieces of parts. Further, since the irradiating light control apparatus 80 can be made to be small-sized, also the headlamp 10 for an automobile integrated therewith can be constituted to be small-sized.

Further, the switching drive portion (solenoid) 310 of the light amount changing device 300 is arranged by utilizing the inner space of the horizontal pivoting shaft 110 and therefore, it is not necessary to prepare a special space for arranging the switching driving portion 310 and the light irradiating light control apparatus 80 can further be made to be small-sized.

Further, the horizontal driving device 100, the vertical driving device 200 and the switching drive portion 310 of the light amount changing device 300 are integrated to the single case 81 and therefore, handling of the irradiating light control apparatus 80 is facilitated.

Furthermore, the lamp unit 60 is supported at inside of the lamp housing 20 pivotably in the horizontal direction and in the vertical direction, the irradiating light control apparatus 80 is made to be pivotable in the vertical direction relative to the lamp housing 20 along with the lamp unit 60 and therefore, the irradiating light control apparatus 80 can integrally be handled in the state of being integrated to the lamp unit 60 and therefore, operability thereof in integrating to the lamp housing 20 becomes excellent.

Further, power feeding and/or supply of the control signal to the horizontal driving device 100, the vertical driving device 200 and the switching drive portion 310 of the light amount changing device 300 are carried out by way of the single connector 420 and therefore, the irradiating light control circuit 500 can be simplified.

Further, at inside of the case 81 of the irradiating light control apparatus 80, the mechanism portion 85 arranged with mechanism parts and the circuit portion 86 arranged with the circuit board 400 are partitioned by the middle wall 92 and therefore, there is an inconsiderable concern of adhering grease or abrasion chips in accordance with operation of mechanism parts and the like to the circuit board 400 and erroneous operation or the like of circuits formed on the circuit board 400 can be avoided.

Further, although the embodiment shows a constitution of the lamp unit 60 constituted by the converging type reflector 61 and the light source 62 and the projecting lens 63 and the shade 64, the present invention is not limited to such a type but other type of lamp unit, for example, an lamp unit of a type including a paraboloid reflecting mirror and a light source and a front lens for controlling a light distribution by a position of the light source and various steps formed on the front lens, and a light blocking cap for covering a portion of the light source as necessary can also be used.

Otherwise, all of shapes and structures of respective portions shown in the embodiment only show an example of embodiment in embodying the present invention, and a technical range of the present invention is not to be interpreted limitingly thereby.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle lamp comprising:
a lamp unit; and
an irradiating light control apparatus constituted by an integral assembly comprising:
a horizontal driving device to swing the lamp unit in a horizontal direction;
a vertical driving device to tilt the lamp unit in a vertical direction; and
a switching drive portion of a light amount changing device to change an irradiating light amount of an irradiating light of the lamp unit,
wherein the light amount changing device comprises a shade to block a part of the light emitted from the light source, wherein an amount of blocked light is changed by switching a position of the shade;
the horizontal driving device includes a horizontal pivoting shaft connected to the lamp unit;
the switching drive portion includes a switching drive shaft disposed at a center of the horizontal pivoting shaft;
a position of the shade is switchable by moving the switching drive shaft in an up and down direction; and
the lamp unit is swingable in the horizontal direction by rotating the horizontal pivoting shaft.

2. The vehicle lamp according to claim 1, wherein the lamp unit is pivotably supported inside a lamp housing in the horizontal direction and in the vertical direction; and
the irradiating light control apparatus is pivotable in the vertical direction with the lamp unit relative to the lamp housing.

3. The vehicle lamp according to claim 1, further comprising:
a single connector through which power and control signals are supplied to the horizontal driving device, the vertical driving device and the switching drive portion.

4. A vehicle lamp comprising:
a lamp chamber including a lamp housing and a cover covering a front opening of the lamp housing;
a lamp unit including a light source bulb, disposed within the lamp chamber, and movable with respect to the lamp chamber in both horizontal and vertical directions; and
an irradiating light control apparatus constituted by an integral assembly comprising:
a horizontal driving device to swing the lamp unit in the horizontal direction;
a vertical driving device to tilt the lamp unit in the vertical direction; and
a switching drive portion of a light amount changing device to change an irradiating light amount of an irradiating light of the lamp unit, wherein the horizontal driving device, the vertical driving device and the switching drive portion are integrated within a single case disposed within the lamp chamber, wherein the single case is coupled to the lamp unit and tiltable with the lamp unit in the vertical direction.

5. A vehicle lamp comprising:
a lamp chamber including a lamp housing and a cover covering a front opening of the lamp housing;
a lamp unit including a light source bulb, disposed within the lamp chamber, and movable with respect to the lamp chamber in both horizontal and vertical directions; and
an irradiating light control apparatus constituted by an integral assembly comprising a horizontal driving device to swing the lamp unit in a the horizontal direction, and a vertical driving device to tilt the lamp unit in the vertical direction, within a single case member disposed within the lamp chamber, wherein the single case member is coupled to the lamp unit and tiltable with the lamp unit in the vertical direction,
wherein a horizontal pivoting shaft of the horizontal driving device, a horizontal direction driving motor to drive the horizontal pivoting shaft, a vertical direction driving motor to drive the vertical driving device, and a connector for the horizontal direction driving motor and the vertical direction driving motor are arranged on a same axis.

6. The vehicle lamp according to claim 5, further comprising a light amount changing device to change an irradiating light amount of an irradiating light of the lamp unit, wherein a drive portion of the light amount changing device is integrally assembled within the irradiating light control apparatus, and an operating shaft of the light amount changing device is arranged on the axis.

7. The vehicle lamp according to claim 5, further comprising a middle wall wherein the case member is divided into a circuit portion and a mechanism portion by the middle wall, mechanism parts are arranged in the mechanism portion, and a circuit board is arranged in the circuit portion.

8. The vehicle lamp according to claim 5, further comprising connecting portions including inserting holes and facing holes for connecting the circuit portion and the mechanism portion, wherein the inserting holes and the facing holes are symmetrically arranged with respect to the axis.

9. A vehicle lamp comprising:

a lamp housing;

a lamp unit tiltably supported in the lamp housing at a first tilting fulcrum; and a vertical driving device to tilt the lamp unit in a vertical direction by an axial movement of a leveling output shaft of the vertical driving device, wherein the vertical driving device is supported by the lamp unit, an end of the leveling output shaft is connected to the lamp housing at a connecting point, and a line including a second tilting fulcrum and a point on the leveling output shaft intersects with the leveling output shaft at substantially 90° wherein the second tilting fulcrum is vertically displaced from the leveling output shaft.

10. The vehicle lamp according to claim 9, further comprising a horizontal driving device to swing the lamp unit in a horizontal direction, wherein the vertical driving device and the horizontal driving device are integrally assembled.

11. The vehicle lamp according to claim 10, wherein the vertical driving device and the horizontal driving device are integrally assembled within a single case disposed within the lamp housing, and wherein the single case is coupled to the lamp unit and tiltable with the lamp unit in the vertical direction.

12. The vehicle lamp according to claim 9, further comprising a light amount changing device to change an irradiating light amount of an irradiating light of the lamp unit, wherein a drive portion of the light amount changing device is integrally assembled with the vertical driving device.

* * * * *